(12) United States Patent
Junge et al.

(10) Patent No.: US 10,114,264 B2
(45) Date of Patent: Oct. 30, 2018

(54) DEVICE FOR REGULATING THE PASSAGE OF ENERGY

(71) Applicant: Merck Patent GmbH, Darmstadt (DE)

(72) Inventors: Michael Junge, Pfungstadt (DE); Andreas Beyer, Hanau (DE); Ursula Patwal, Reinheim (DE)

(73) Assignee: Merck Patent GmbH, Darmstadt (DE)

( * ) Notice: Subject to any disclaimer, the term of this patent is extended or adjusted under 35 U.S.C. 154(b) by 10 days.

(21) Appl. No.: 14/772,422

(22) PCT Filed: Feb. 7, 2014

(86) PCT No.: PCT/EP2014/000341
§ 371 (c)(1),
(2) Date: Sep. 3, 2015

(87) PCT Pub. No.: WO2014/135240
PCT Pub. Date: Sep. 12, 2014

(65) Prior Publication Data
US 2016/0033807 A1 Feb. 4, 2016

(30) Foreign Application Priority Data
Mar. 5, 2013 (EP) .................................. 13001095

(51) Int. Cl.
| G02F 1/1337 | (2006.01) |
| G02F 1/137 | (2006.01) |
| C09K 19/60 | (2006.01) |
| E06B 3/67 | (2006.01) |
| G02F 1/133 | (2006.01) |
| C09K 19/20 | (2006.01) |
| C09K 19/30 | (2006.01) |

(52) U.S. Cl.
CPC .......... *G02F 1/13725* (2013.01); *C09K 19/60* (2013.01); *C09K 19/601* (2013.01); *C09K 19/603* (2013.01); *C09K 19/606* (2013.01); *E06B 3/6722* (2013.01); *G02F 1/1337* (2013.01); *G02F 1/13306* (2013.01); *G02F 1/13737* (2013.01); *G02F 1/13762* (2013.01); *C09K 2019/2035* (2013.01); *C09K 2019/3009* (2013.01); *C09K 2019/3016* (2013.01); *C09K 2019/3077* (2013.01); *C09K 2019/3078* (2013.01); *C09K 2019/3083* (2013.01); *C09K 2219/13* (2013.01); *G02F 2001/13324* (2013.01); *G02F 2001/13706* (2013.01); *G02F 2001/133738* (2013.01); *G02F 2203/48* (2013.01)

(58) Field of Classification Search
CPC ....... G02F 2203/48; G02F 2001/13706; G02F 2001/133738; G02F 2001/13324; G02F 1/13762; G02F 1/13737; G02F 1/13725; C09K 2219/13; C09K 2019/3083; C09K 2019/3078; C09K 2019/3077; C09K 2019/3016; C09K 2019/3009; C09K 2019/2035; C09K 19/606; C09K 19/603; C09K 19/601; C09K 19/60; E06B 3/6722
See application file for complete search history.

(56) References Cited

U.S. PATENT DOCUMENTS

| 4,466,899 | A | 8/1984 | Ditter et al. |
| 5,067,795 | A | 11/1991 | Senatore |
| 7,736,533 | B2 * | 6/2010 | Takaku ................ C09K 19/544 252/299.01 |
| 8,927,070 | B2 | 1/2015 | Iwahashi |
| 8,927,856 | B2 | 1/2015 | Debije et al. |
| 2001/0022636 | A1 * | 9/2001 | Yang ...................... G02B 6/003 349/65 |
| 2005/0206832 | A1 * | 9/2005 | Tahara ................ C09K 19/544 349/182 |
| 2011/0094585 | A1 | 4/2011 | Debije et al. |
| 2012/0038841 | A1 | 2/2012 | Taheri |
| 2013/0258266 | A1 * | 10/2013 | Sukhomlinova ..... C09K 19/601 349/179 |
| 2015/0299577 | A1 | 10/2015 | Junge |

FOREIGN PATENT DOCUMENTS

| CN | 102037565 A | 4/2011 |
| CN | 102171592 A | 5/2014 |
| EP | 0056492 A1 | 7/1982 |
| JP | 2008268762 A2 | 11/2008 |
| JP | 2009108295 A | 5/2009 |
| JP | 2011524539 A | 9/2011 |
| WO | 2012047843 A1 | 4/2012 |
| WO | 2014090373 A1 | 6/2014 |

OTHER PUBLICATIONS

International Search Report from PCT Application No. PCT/EP2014/000341 dated Nov. 11, 2014.
Office Action in corresponding EP appl. No. 14703541 dated May 31, 2017.
English machine translation of JP2008268762A dated Nov. 5, 2008 to Yoshida Kazuo of Matsushita Electric Works Ltd.
Office Action in corresponding TW appl. No. 103107307 dated Sep. 33, 2017.

(Continued)

*Primary Examiner* — Nathaniel R Briggs
(74) *Attorney, Agent, or Firm* — Millen White Zelano & Branigan, PC

(57) ABSTRACT

The present application relates to a device for regulating the passage of light through a light-transmitting area which comprises a switching layer comprising a liquid-crystalline medium comprising at least one dichroic dye, where the parameters degree of light transmission and degree of anisotropy of the device are selected in a certain manner.

31 Claims, No Drawings

(56) References Cited

OTHER PUBLICATIONS

Office Action in corresponding JP appl. No. 2015-560570 dated Jan. 4, 2018.
Third party observations/ Office Action in corresponding EP appl. No. 14703541.4 dated Jun. 8, 2018.
English Abstract of CN 102037565 A published Apr. 27, 2011.

* cited by examiner

DEVICE FOR REGULATING THE PASSAGE OF ENERGY

The present application relates to a device for regulating the passage of light through a light-transmitting area which comprises a switching layer which comprises a liquid-crystalline medium comprising at least one dichroic dye. The device is preferably employed for regulating the passage of light through windows and similar building openings in order to control the input of energy into a building.

For the purposes of the present invention, the term light is taken to mean electromagnetic radiation in the UV-A, VIS and NIR region. In particular, it is taken to mean radiation which is not absorbed or is only absorbed to a negligible extent by the materials usually used in windows (for example glass). According to the definitions usually used, UV-A light is taken to mean radiation having a wavelength of 320 to 380 nm, VIS light is taken to mean radiation having a wavelength of 380 nm to 780 nm and NIR light is taken to mean radiation having a wavelength of 780 nm to 2000 nm. For the purposes of the present invention, the term light is therefore taken to mean radiation having a wavelength of 320 to 2000 nm.

For the purposes of the present application, the term liquid-crystalline medium is taken to mean a material which has liquid-crystalline properties under certain conditions. The material preferably has liquid-crystalline properties at room temperature and in a certain temperature range above and below room temperature. The liquid-crystalline medium may comprise a single compound or it may comprise a plurality of different compounds.

For the purposes of the present application, a dichroic dye is taken to mean a light-absorbing compound in which the absorption properties are dependent on the alignment of the molecules to the direction of polarisation of the light.

The energy efficiency of buildings is increasing in importance with increasing energy costs. Windows and glass facades represent the parts of buildings through which the majority of the energy input into the building takes place in the case of intense insolation.

In the cold season, it is desired for a maximum of light and thus transported energy to enter a building through glass areas. This enables heating and lighting costs to be saved.

In the warm season, on the other hand, it is desired for the lowest possible input of energy into a building through glass areas to occur. This enables a more pleasant room climate to be achieved or air-conditioning costs to be saved. Furthermore, a reduction in the incident light intensity may be desired in these cases, for example in order to reduce dazzle due to direct insolation.

There is therefore a demand for devices which control the passage of light and thus the flow of energy through windows or glass areas. In particular, there is a demand for devices which are able to match the flow of energy through glass areas to the conditions prevailing at a particular point in time (heat, cold, high insolation, low insolation).

The prior art discloses devices which are in principle suitable for regulating the entry of light through window areas or the like. These comprise, as switching layer, a liquid-crystalline medium comprising one or more dichroic dyes. For example, WO 2009/141295 discloses a switching device which functions with electrical control and comprises a switching layer comprising a liquid-crystalline medium comprising one or more dichroic dyes. The switching layer represents a guest/host system which is known for use in display devices (cf. B. Bahadur et al., Mol. Cryst. Liq. Cryst., 1991, 209, 39-61).

The devices from WO 2010/118422, which are switchable under temperature control, also have a switching layer which represents a guest/host system.

Investigations in the course of the present invention have shown that the achievement of the greatest possible switching range, i.e. the greatest possible difference between the light transmission in the bright state and the light transmission in the dark state of the device, is very desirable for devices for regulating the passage of light.

This technical object has to date not been paid any attention in connection with switching devices comprising a liquid-crystalline medium comprising one or more dichroic dyes. Instead, such devices have usually been optimised with respect to their contrast, i.e. to the ratio of light transmission in the bright state to light transmission in the dark state. However, the contrast is of little importance in the case of the use for regulating the passage of light through a light-transmitting area, since it is principally high light transmission in the bright state and less the darkest possible dark state that is important.

In the course of investigations on the above-mentioned devices for regulating the passage of light, it has now been found that excellent values for the range of light transmission of the device can be achieved for certain combinations of the parameters of the switching layer degree of anisotropy R and light transmission in the bright state $\tau_{v\ bright}$.

The degree of anisotropy R of the switching layer is calculated from the measured values for the absorbance of light polarised parallel to the alignment direction of the aligned molecules of the liquid-crystalline medium E(p) and the measured values for the absorbance of light polarised perpendicular to the alignment direction of the aligned molecules of the liquid-crystalline medium E(s) in accordance with the formula $R=[E(p)-E(s)]/[E(p)+2*E(s)]$. The reference used here is an otherwise identical device which comprises no dye in the switching layer. The precise method is indicated in the working examples under B) 1).

The degree of light transmission in the bright state $\tau_{v\ bright}$ of the switching layer is indicated in percent. It is calculated from the ratio of the degree of light transmission of the switching layer in the bright state of the device relative to a device having a switching layer without dye as reference. For the purposes of the present application, it is determined in accordance with European Standard EN410, equation (1) (Determination of luminous and solar characteristics of glazing) from the spectral degrees of transmission taking into account the relative spectral distribution of the standard illuminant and the spectral degree of brightness sensitivity of the standard observer.

The range of the degree of light transmission of the switching layer is indicated in percent. It represents the difference between the degree of light transmission in the bright state ($\tau_{v\ bright}$) and the degree of light transmission in the dark state ($\tau_{v\ dark}$). The value $\tau_{v\ dark}$ here is determined in accordance with the above-mentioned method for the measurement of $\tau_{v\ bright}$, with the device switched into the dark state.

The present application thus relates to a device for regulating the passage of light through a light-transmitting area, where the device comprises at least one switching layer which comprises a liquid-crystalline medium comprising at least one dichroic dye, and where the switching layer has a degree of anisotropy R of at least 0.65 and a degree of light transmission in the bright state $\tau_{v\ bright}$ in accordance with Standard EN410 of 40% to 90%.

A device of this type has the advantage that it has a large range of light transmission. This is preferably greater than 25%, particularly preferably greater than 28%, very particularly preferably greater than 30%, and most preferably greater than 35% for a device having a single switching layer.

The device is preferably characterised in that the switching layer has a degree of anisotropy R of 0.7 to 0.9, preferably 0.7 to 0.85, very particularly preferably 0.75 to 0.8.

The device is furthermore preferably characterised in that the switching layer has a degree of light transmission in the bright state $\tau_{v\ bright}$ of 60% to 85%, preferably 70% to 80%.

The device is preferably characterised in that the following applies to the parameter $\tau_{v\ bright}$ of the switching layer for a given parameter R:

$$\tau_{v\ bright\ min} < \tau_{v\ bright} < \tau_{v\ bright\ max}\ \text{and}$$

$$\tau_{v\ bright\ min} = 0.8*(67*R+30)\ \text{and}\ \tau_{v\ bright\ max} = 1.2*(67*R+30).$$

The device is preferably characterised in that the following applies to the parameter R of the switching layer for a given parameter $\tau_{v\ bright}$:

$$R_{min} < R < R_{max}\ \text{and}$$

$$R_{min} = 0.8*(0.015*\tau_{v\ bright} - 0.45)\ \text{and}\ R_{max} = 1.2*(0.015*\tau_{v\ bright} - 0.45).$$

The device is preferably applied to a light-transmitting area of a building, container, vehicle or other substantially closed space. However, the device can be used for any desired interior spaces, particularly if these have only limited air exchange with the environment and have light-transmitting boundary surfaces through which input of energy from the outside in the form of light energy can take place. The use of the device is particularly relevant for interior spaces which are subjected to strong insolation through light-transmitting areas, for example through window areas.

The invention therefore furthermore relates to the use of the device according to the invention, as described above, for regulating the passage of light through a light-transmitting area into an interior space.

The device according to the invention can also be employed for aesthetic room design, for example for light and colour effects. Its signal action may also occur. For example, door and wall elements comprising the device according to the invention in grey or in colour can be switched to transparent. Furthermore, the device may also comprise a white or coloured flat backlight which is modulated in brightness, or a yellow flat backlight which is modulated in colour using a blue guest/host display. Further aesthetic effects can also be produced with the aid of light sources shining in from the side, such as white or coloured LEDs or LED chains, in combination with the device according to the invention. In this case, one or both glass sides of the device according to the invention may be provided with roughened or structured glass for the coupling-out of light and/or for the generation of light effects.

In a preferred embodiment, the device according to the invention is a component of a window, particularly preferably a window comprising at least one glass area, very particularly preferably a window which comprises multipane insulating glass.

According to a preferred embodiment, the device according to the invention is applied directly to a glass area of a window, particularly preferably in the interior of multipane insulating glass.

It is furthermore preferred for the device to have at least two glass panes. The window comprising the device particularly preferably has in total at least three glass panes. It is preferred here for the device to be arranged between two glass panes of the window.

According to a preferred embodiment, the device is applied in the interior of multipane insulating glass or to the outside of a glass of this type. Preference is generally given to the use on a side of a pane facing towards the interior space or in the interspace between two glass panes in the case of multipane insulating glass. However, other arrangements are also conceivable and to be preferred in certain cases. The person skilled in the art will be able to weigh up advantages and disadvantages of certain arrangements with respect to the durability of the device, optical and aesthetic points of view, practical points of view with respect to cleaning of the panes and with respect to the reactivity of the device to changes in temperature.

Particular preference is given to an arrangement in which a first glass pane of the window is formed by a glass pane of the device, so that the layer sequence of the window comprising the device is as follows:
1) Glass layer
2) Electrically conductive layer, preferably ITO layer
3) Alignment layer
4) Switching layer
5) Alignment layer
6) Electrically conductive layer, preferably ITO layer
7) Glass layer
8) Glass layer,
where a free space is present between glass layers 7) and 8), which may be filled, for example, with an insulating gas, such as a noble gas.

The window is preferably arranged in such a way that layer 1) is adjacent to the outside and layer 8) is adjacent to the inside. However, a reverse arrangement is also possible and preferred under certain conditions.

The above-mentioned layer sequence may be supplemented by further layers, such as, for example, additional glass layers or protective layers, for example against UV radiation, against NIR radiation, against VIS radiation and/or against physical damage.

An application of this type can be carried out by retrofitting an existing window or by complete new installation.

The device is preferably characterised in that it has an area of at least 0.05 $m^2$, preferably at least 0.1 $m^2$, particularly preferably at least 0.5 $m^2$ and very particularly preferably at least 0.8 $m^2$.

The device is a switchable device. Switching of the device here is taken to mean a change in the light transmission of the device. This can be utilised in accordance with the invention for regulating the passage of light through the device and thus the entry of light into a space.

The device according to the invention is preferably electrically switchable. However, it may also be purely thermally switchable, as described, for example, in WO 2010/118422 for devices for regulating the passage of light.

In the latter case, the switching preferably takes place through a transition from a nematic state to an isotropic state due to a change in the temperature of the switching layer comprising the liquid-crystalline medium according to the invention.

In the nematic state, the molecules of the liquid-crystalline medium are in ordered form and thus so are the dichroic compounds, for example aligned parallel to the surface of the device due to the action of an alignment layer. In the isotropic state, the molecules are in unordered form. The ordering of the molecules of the liquid-crystalline medium causes an ordering of the dichroic dyes. The difference between ordered and unordered presence of the dichroic dyes itself causes a difference in the light transmission of the device according to the invention, in accordance with the principle that dichroic dye molecules have a higher or lower absorption coefficient depending on the alignment with respect to the plane of vibration of the light.

If the device is electrically switchable, it comprises means for the alignment of the molecules of the liquid-crystalline medium of the switching layer by means of electrical voltage. In this case, it preferably comprises two or more electrodes, which are installed on both sides of the switching layer comprising the liquid-crystalline medium. The electrodes preferably consist of ITO or a thin, preferably transparent metal and/or metal-oxide layer, for example of silver or an alternative material known to the person skilled in the art for this use. The electrodes are preferably provided with electrical connections. The power supply is preferably provided by a battery, a rechargeable battery, a supercapacitor or by external power supply.

The switching operation in the case of electrical switching by an alignment of the molecules of the liquid-crystalline medium takes place by the application of voltage. The at least one dichroic dye is thereby likewise aligned, as explained above, so that a difference is caused in the light transmission of the device.

In a preferred embodiment, the device is converted from a state having high absorption, i.e. low light transmission, which is present without voltage, into a state having lower absorption, i.e. higher light transmission. The liquid-crystalline medium is preferably nematic in both states. The voltage-free state is preferably characterised in that the molecules of the liquid-crystalline medium, and thus the dichroic dyes, are aligned parallel to the surface of the device (homogeneous alignment). This is preferably achieved by an appropriately selected alignment layer. The state under voltage is preferably characterised in that the molecules of the liquid-crystalline medium, and thus the dichroic dyes, are perpendicular to the surface of the device.

In an alternative embodiment to the embodiment mentioned above, the device is converted from a state having low absorption, i.e. high light transmission, which is present without voltage, into a state having higher absorption, i.e. lower light transmission. The liquid-crystalline medium is preferably nematic in both states. The voltage-free state is preferably characterised in that the molecules of the liquid-crystalline medium, and thus the dichroic dyes, are aligned perpendicular to the surface of the device (homeotropic alignment). This is preferably achieved by an appropriately selected alignment layer. The state under voltage is then preferably characterised in that the molecules of the liquid-crystalline medium, and thus the dichroic dyes, are parallel to the surface of the device.

According to a preferred embodiment, the device according to the invention is characterised in that it generates all the energy required for switching the switching layer itself. The device is thus preferably autonomous and does not require any externally supplied energy. To this end, it preferably comprises a device for the conversion of light energy into electrical energy, particularly preferably a solar cell.

In a preferred embodiment of the invention, the device for the conversion of light energy into electrical energy is electrically connected to the means for electrical switching of the device according to the invention. The provision of the energy by the solar cell can take place directly or indirectly, i.e. via a battery or rechargeable battery or other unit for the storage of energy connected in between. The solar cell is preferably applied to the outside of the device or to the inside of the device, as disclosed, for example, in WO 2009/141295. Preference is given to the use of solar cells which are particularly efficient in the case of diffuse light, and transparent solar cells. For example, it is possible to use silicon solar cells or organic solar cells in the devices according to the invention.

The device preferably has the following layer structure, where the layers are preferably directly adjacent to one another:
1) Glass layer or polymer layer
2) Electrically conductive layer, preferably ITO layer
3) Alignment layer
4) Switching layer
5) Alignment layer
6) Electrically conductive layer, preferably ITO layer
7) Glass layer or polymer layer.

The device preferably comprises one or more, particularly preferably two, alignment layers which are arranged directly adjacent to the switching layer. The alignment layer and the electrode may be present in a double layer, for example in a polyimide-coated ITO layer. The alignment layers are preferably polyimide layers, particularly preferably layers comprising rubbed polyimide. Polyimide rubbed in a certain manner known to the person skilled in the art results in a preferential alignment of the molecules of the liquid-crystalline medium in the rubbing direction if the molecules are planar to the alignment layer (homogeneous alignment). In order to achieve vertical alignment of the molecules of the liquid-crystalline medium to the surface of the alignment layer (homeotropic alignment), polyimide treated in a certain manner is preferably employed as material for the alignment layer (polyimide for very high pretilt angles). Furthermore, polymers obtained by an exposure process with polarised light can be used as alignment layer for achieving a preferential direction of the molecules of the liquid-crystalline medium (photoalignment).

It is furthermore preferred for the molecules of the liquid-crystalline medium to be not completely planar on the alignment layer in the case of homogeneous alignment, but instead to have a slight tilt angle (pretilt).

It is preferred in accordance with the invention for two or more alignment layers to be present which cause a parallel or 90°-rotated preferential direction of the molecules of the liquid-crystalline medium on both sides of the switching layer.

The device particularly preferably comprises precisely two alignment layers, one of which is adjacent to one side of the switching layer and the other is adjacent to the opposite side of the switching layer, where the two alignment layers cause a parallel or 90°-rotated preferential direction of the molecules of the liquid-crystalline medium on both sides of the switching layer.

In the case of the parallel arrangement, the molecules of the liquid-crystalline medium on both sides of the switching layer comprising the liquid-crystalline medium and within the switching layer comprising the liquid-crystalline medium are parallel to one another. In the case of the 90°-twisted arrangement, the molecules of the liquid-crystalline medium on one side of the switching layer are at an angle of 90° to the molecules on the other side of the switching layer. Within the switching layer, the molecules are at intermediate angles, so that a smooth transition is present between the preferential alignment on one side of the switching layer and the preferential direction on the other side of the switching layer.

It is furthermore preferred for a homogeneous alignment of the molecules of the liquid-crystalline medium to be present in the voltage-free state, where the molecules are aligned parallel to one another on both sides of the switching layer.

However, alternative embodiments of the alignment layer and the consequent alignment of the molecules of the liquid-crystalline medium, which the person skilled in the art in the area of devices comprising liquid-crystalline media is familiar with and can employ if necessary, are conceivable.

Furthermore preferably, the switching layer in the device according to the invention is arranged between two substrate layers or is surrounded thereby. The substrate layers can consist, for example, of glass or a polymer, in particular of glass, PET, PEN, PVB or PMMA.

The device is preferably characterised in that it does not comprise a polymer-based polariser, particularly preferably does not comprise a polariser in solid material phase and very particularly preferably does not comprise any polariser at all.

However, the device may, in accordance with an alternative embodiment, also comprise one or more polarisers. These are preferably linear polarisers. If one or more polarisers are present, these are preferably arranged parallel to the switching layer.

If precisely one polariser is present, its absorption direction is preferably perpendicular to the preferential alignment of the molecules of the liquid-crystalline medium of the device according to the invention on the side of the switching layer on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. No. 7,038,745 and U.S. Pat. No. 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU1220DUN polariser film. An example of a circular polariser which can be used in accordance with the invention is the APNCP37-035-STD polariser (American Polarizers). A further example is the CP42 polariser (ITOS).

It is preferred for the device according to the invention to comprise precisely one switching layer.

The switching layer preferably has a thickness between 1 and 100 μm, particularly preferably between 5 and 50 μm.

The device is preferably characterised in that the switching layer comprises three or more different dichroic dyes.

It is furthermore preferred for at least one of the dichroic dyes to be luminescent, preferably fluorescent.

Fluorescence here is taken to mean that a compound is placed in an electronically excited state by absorption of light having a certain wavelength, where the compound is subsequently converted into the ground state with emission of light. The emitted light preferably has a longer wavelength than the absorbed light. The transition from the excited state to the ground state is furthermore preferably spin-allowed, i.e. takes place without a change in the spin. The lifetime of the excited state of the fluorescent compound is furthermore preferably shorter than $10^{-5}$ s, particularly preferably shorter than $10^{-6}$ s, very particularly preferably between $10^{-9}$ and $10^{-7}$ s.

The absorption spectra of the dichroic dyes in the liquid-crystalline medium preferably complement one another in such a way that the impression of a black colour arises for the eye. The two or more dichroic dyes of the liquid-crystalline medium preferably cover a large part of the visible spectrum. This is preferably achieved through at least one dichroic dye absorbing red light, at least one absorbing green to yellow light and at least one absorbing blue light.

The precise way in which a mixture of dyes which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The dichroic dyes furthermore preferably absorb predominantly light in the UV-VIS-NIR region, i.e. in a wavelength range from 320 to 2000 nm. UV light, VIS light and NIR light here are as defined above. The dichroic dyes particularly preferably have absorption maxima in the range from 400 to 1300 nm.

The proportion of all dichroic dyes together in the liquid-crystalline medium is preferably in total 0.01 to 10% by weight, particularly preferably 0.1 to 7% by weight and very particularly preferably 0.2 to 7% by weight. The proportion of an individual dichroic dye is preferably 0.01 to 10% by weight, preferably 0.05 to 7% by weight and very particularly preferably 0.1 to 7% by weight.

The dichroic dyes are furthermore preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

Preferably at least one dichroic dye, particularly preferably all dichroic dyes are selected from azo compounds, anthraquinones, methine compounds, azomethine compounds, merocyanine compounds, naphthoquinones, tetrazines, perylenes, terrylenes, quaterrylenes, higher rylenes and pyrromethenes.

Anthraquinone dyes are described, for example, in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described, for example, in DE 3126108 and DE 3202761, azo dyes in EP 43904, DE 3123519, WO 82/2054, GB 2079770, JP-A 56-57850, JP-A 56-104984, U.S. Pat. No. 4,308,161, U.S. Pat. No. 4,308,162, U.S. Pat. No. 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes in EP 60895, EP 68427 and WO 82/1191.

Very particular preference is given to rylene dyes, as disclosed, for example, in EP 2166040, US 2011/0042651, EP 68427, EP 47027, EP 60895, DE 3110960 and EP 698649.

According to a preferred embodiment, the liquid-crystalline medium comprises exclusively dichroic dyes selected from the classes of the rylene dyes.

Examples of preferred dichroic dyes which may be present in the liquid-crystalline medium are depicted in the following table:
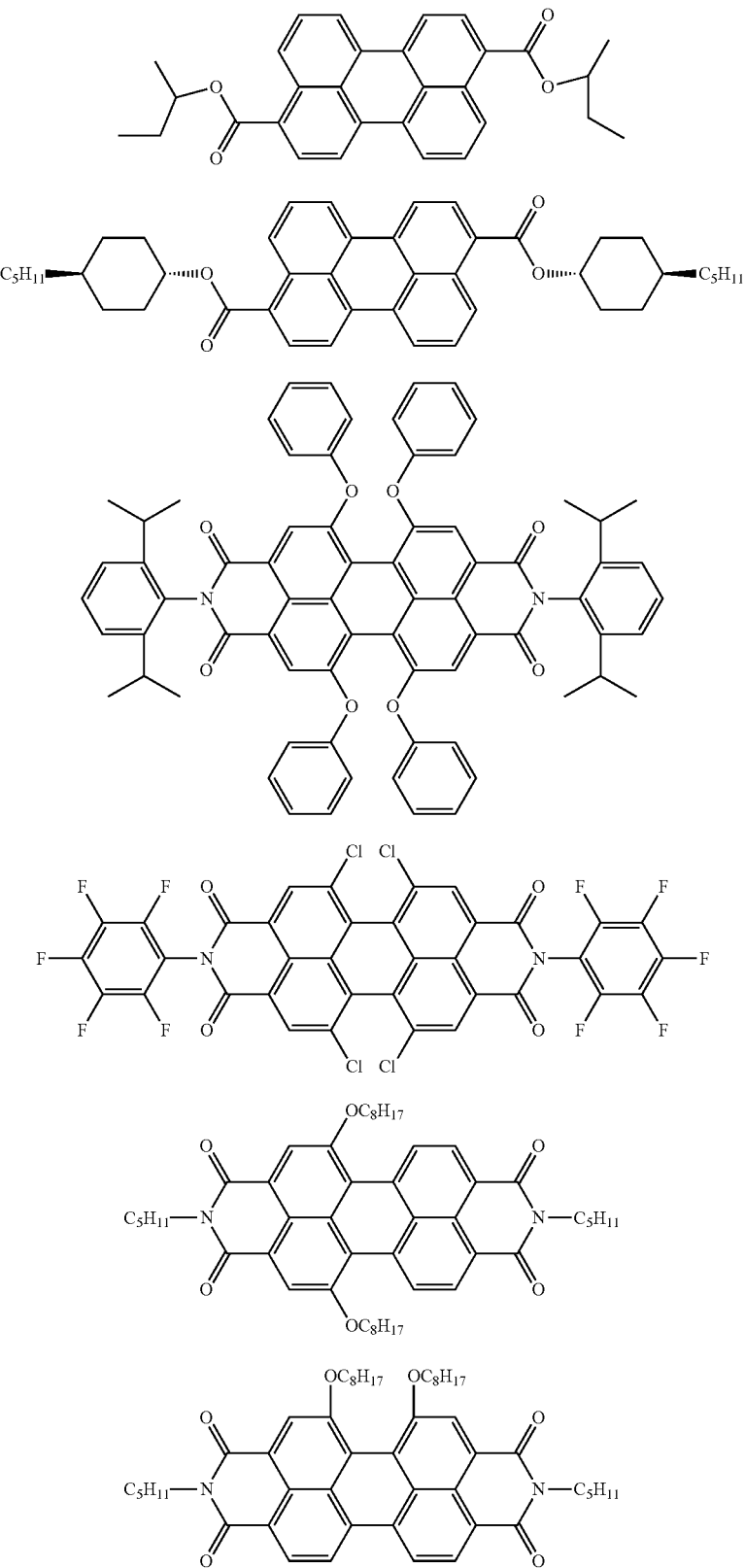

-continued
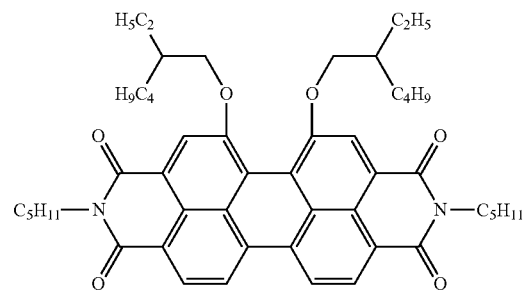
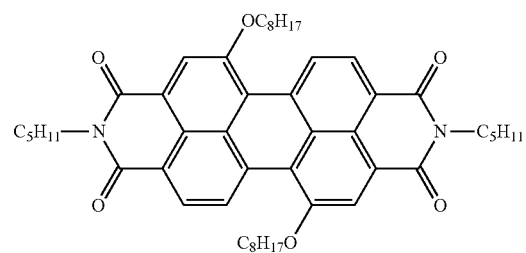
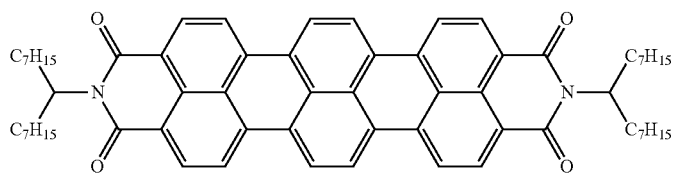
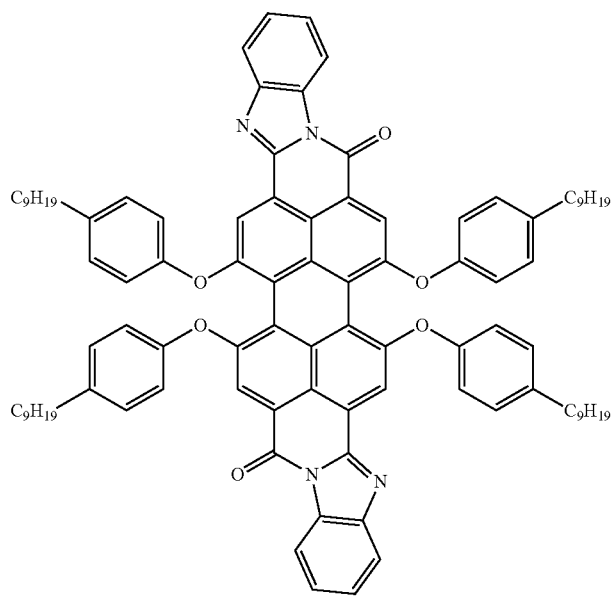
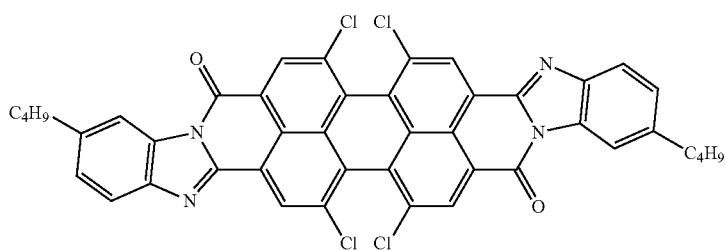

-continued
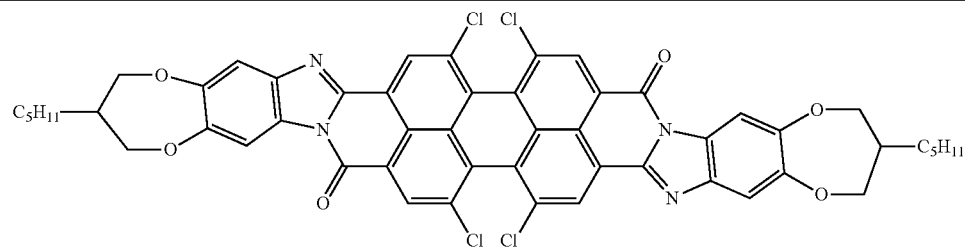
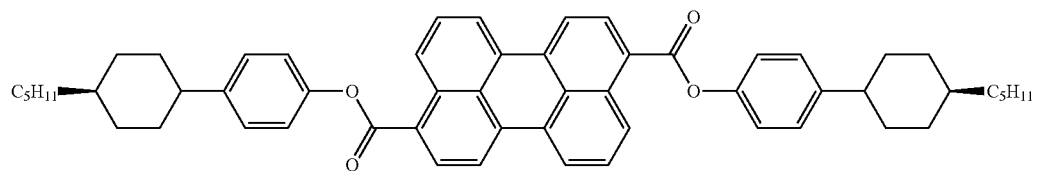
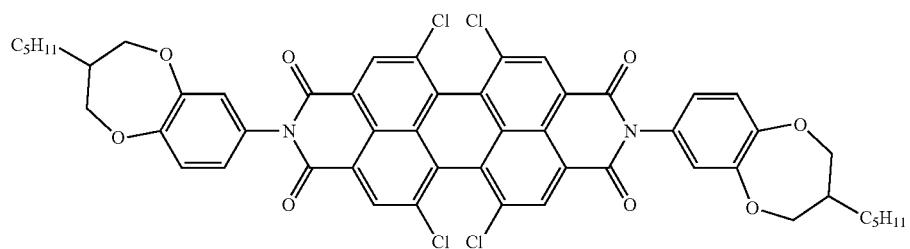
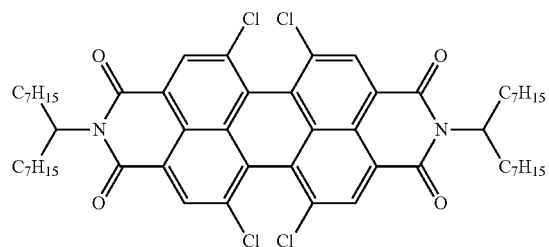
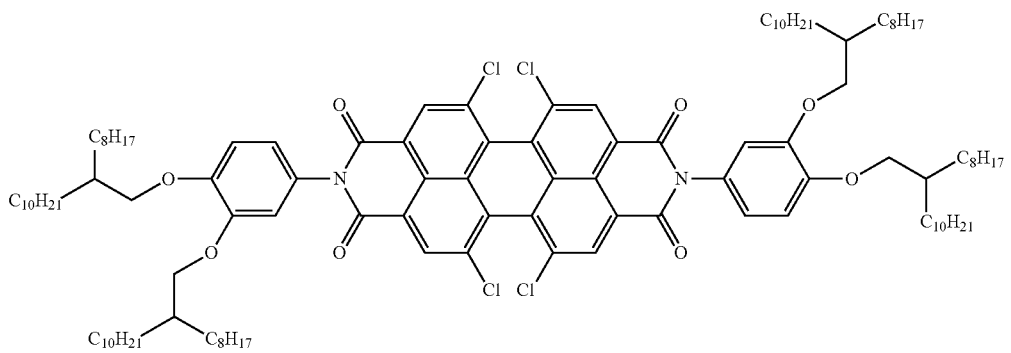
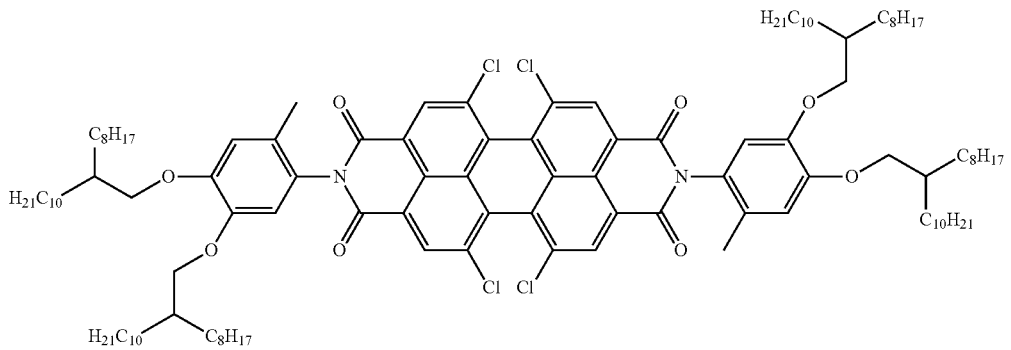

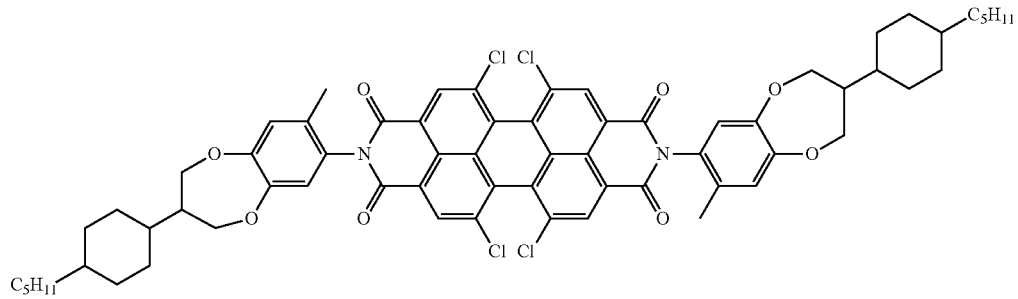
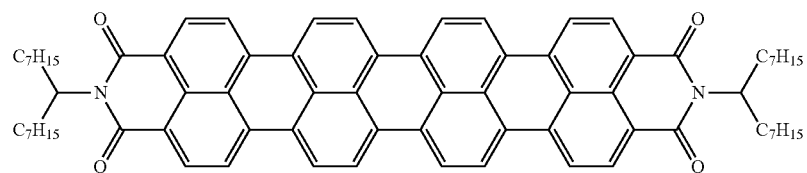
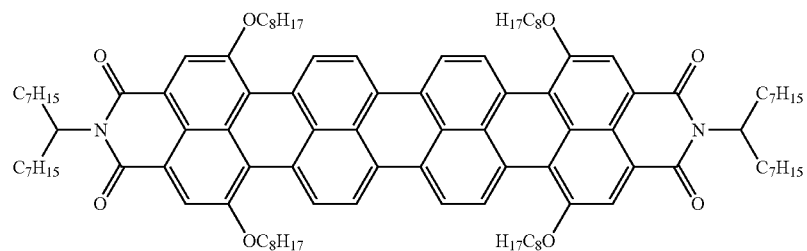
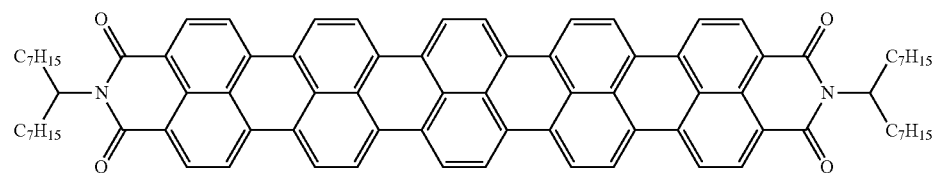
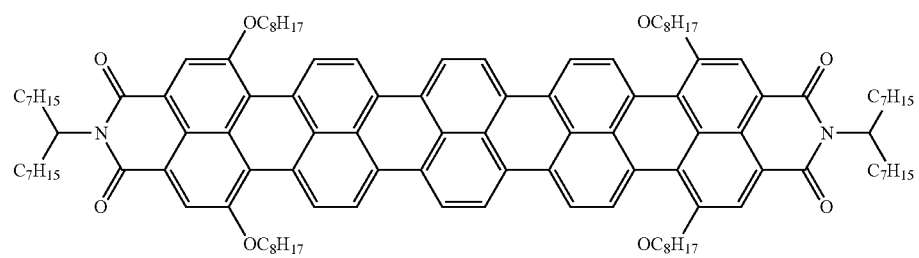
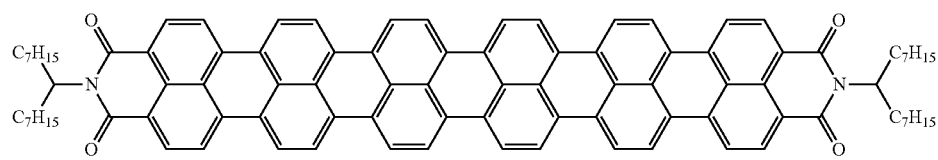

-continued

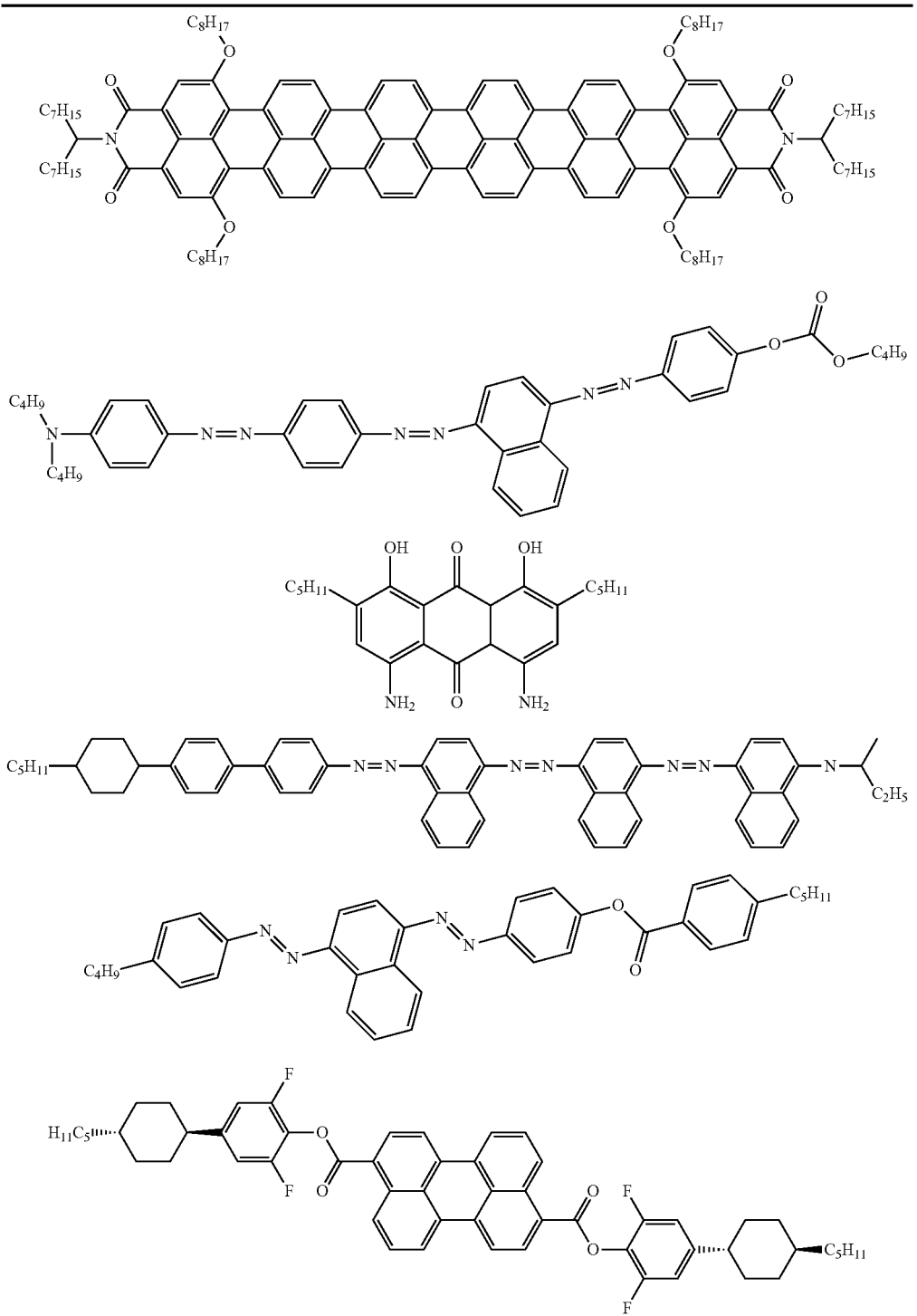

In accordance with the invention, the switching layer of the device comprises a liquid-crystalline medium.

The liquid-crystalline medium is preferably nematically liquid-crystalline at the operating temperature of the device. It is particularly preferably nematically liquid-crystalline in a range of +−20° C., very particularly preferably in a range of +−30° C. above and below the operating temperature of the device.

Alternatively, the liquid-crystalline medium may be cholesterically liquid-crystalline at the operating temperature of the device according to the invention.

The liquid-crystalline medium furthermore preferably has a clearing point, preferably a phase transition from a nematically liquid-crystalline state to an isotropic state, in the temperature range from 70° C. to 170° C., preferably from 90° C. to 160° C., particularly preferably from 95° C. to 150° C. and very particularly preferably from 105° C. to 140° C.

Furthermore, the dielectric anisotropy $\Delta\varepsilon$ of the liquid-crystalline medium is preferably greater than 3, particularly preferably greater than 7.

Alternatively, it may be preferred for the dielectric anisotropy $\Delta\varepsilon$ of the liquid-crystalline medium to be less than −2, preferably less than −3. The liquid-crystalline medium furthermore preferably comprises 3 to 20 different compounds, preferably 8 to 18, particularly preferably 10 to 16 different compounds.

The liquid-crystalline medium furthermore preferably has an optical anisotropy ($\Delta n$) of 0.01 to 0.3, particularly preferably 0.04 to 0.27.

The liquid-crystalline medium furthermore preferably has a specific electrical resistance of greater than $10^{10}$ ohm*cm.

Compounds which can be used as constituents of the liquid-crystalline medium are known to the person skilled in the art and can be selected freely as such.

It is furthermore preferred for the liquid-crystalline medium to comprise at least one compound which contains one or more structural elements based on 1,4-phenylenes and 1,4-cyclohexylenes. It is particularly preferred for the liquid-crystalline medium to comprise at least one compound which contains 2, 3 or 4, particularly preferably 3 or 4 structural elements based on 1,4-phenylenes and 1,4-cyclohexylenes.

The liquid-crystalline medium may comprise one or more chiral dopants. These are then preferably present in a total concentration of 0.01 to 3% by weight, particularly preferably 0.05 to 1% by weight. In order to obtain high values for the twist, the total concentration of the chiral dopants may also be selected higher than 3% by weight, preferably up to a maximum of 10% by weight.

The liquid-crystalline medium preferably comprises one or more stabilisers. The total concentration of the stabilisers is preferably between 0.00001 and 10% by weight, particularly preferably between 0.0001 and 1% by weight of the entire mixture.

The device according to the invention furthermore preferably comprises a light-guide system which conducts light from the switching layer to a unit which converts light energy into electrical energy or heat energy.

The light-guide system is preferably constructed as described in WO 2009/141295. The light-guide system collects and concentrates light which hits the device. It preferably collects and concentrates light which is emitted by fluorescent dichroic dyes in the switching layer comprising the liquid-crystalline medium. The light-guide system is in contact with a device for the conversion of light energy into electrical energy, preferably a solar cell, so that the collected light hits this in concentrated form.

The light-guide system preferably conducts light by total internal reflection. The device is preferably characterised in that the light-guide system has at least one wavelength-selective mirror, which is preferably selected from one or more cholesteric liquid-crystal layers.

The device according to the invention is preferably characterised in that it comprises one or more glass layers which have an antireflection design. The production of antireflection coatings is carried out by coating methods of thin-film technology. These include, for example, physical gas-phase deposition, such as thermal evaporation and sputtering deposition. The antireflection measure can be achieved by a single-layer system or by a multilayer system.

The device according to the invention is preferably characterised in that it comprises two or more glass layers, and in that the degree of light reflection $\rho_v$ in accordance with Standard EN410 of the totality of the layers of the device with the exception of the switching layer is less than 35%, preferably less than 30%, particularly preferably less than 25% and very particularly preferably less than 20%.

The degree of light reflection $\rho_v$ in accordance with Standard EN410 of the totality of the layers of the device with the exception of the switching layer is particularly preferably as indicated above, and the device comprises three or more glass layers.

The degree of light reflection $\rho_v$ of the device is determined by measuring the spectral degrees of reflection of the layer arrangement using a spectrophotometer and by calculating the parameter $\rho_v$ therefrom in accordance with Standard EN410, equation (4), taking into account the relative spectral distribution of the standard illuminant and the spectral degree of brightness sensitivity of the standard observer.

WORKING EXAMPLES

In the present application, structures of liquid-crystalline compounds are reproduced by abbreviations (acronyms). These abbreviations are explicitly presented and explained in WO 2012/052100 (pp. 63-89), so that reference is made to the said published application for an explanation of the abbreviations in the present application.

All physical properties are determined in accordance with "Merck Liquid Crystals, Physical Properties of Liquid Crystals", Status November 1997, Merck KGaA, Germany, and apply for a temperature of 20° C. The value of $\Delta n$ is determined at 589 nm, and the value of $\Delta\varepsilon$ is determined at 1 kHz, unless explicitly indicated otherwise in each case. $n_e$ and $n_o$ are in each case the refractive indices of the extraordinary and ordinary light beam under the conditions indicated above.

A) Production of the Devices
1) Procedure for Construction of the Devices

Devices E-1 to E-6 according to the invention and comparative devices V-1 to V-9 are produced.

The devices according to the invention have the following layer sequence:
a) glass layer comprising polished 1.1 mm soda-lime glass from Corning
b) ITO layer, 200 angstrom
c) alignment layer comprising polyimide AL-1054 from JSR, 300 angstrom
d) liquid-crystalline layer (composition indicated under 2)), 24.3 μm
e) as c)
f) as b)
g) as a)

The alignment layers are rubbed antiparallel.

The ITO layers are provided with appropriate contacts in order to be electrically switchable.

The comparative devices are constructed like the devices according to the invention, with the difference that one or both of the parameters $\tau_{v\ bright}$ (degree of light transmission in the bright state) and R (degree of anisotropy) are outside the range according to the invention, due to the choice of host and/or dye and/or dye concentration in the switching layer.

2) Composition of the Guest/Host Mixtures of the Devices (E: According to the Invention, V: Comparison)

| | Host | Dye | Concentration of dye/% by weight |
|---|---|---|---|
| E-1 | H-1 | D-1 | 0.05 |
| | | D-2 | 0.10 |
| | | D-3 | 0.12 |
| E-2 | H-1 | D-1 | 0.10 |
| | | D-2 | 0.21 |
| | | D-3 | 0.24 |
| E-3 | H-1 | D-1 | 0.17 |
| | | D-2 | 0.35 |
| | | D-3 | 0.40 |
| E-4 | H-2 | D-1 | 0.05 |
| | | D-2 | 0.10 |
| | | D-3 | 0.12 |
| E-5 | H-2 | D-1 | 0.10 |
| | | D-2 | 0.21 |
| | | D-3 | 0.24 |
| E-6 | H-2 | D-1 | 0.17 |
| | | D-2 | 0.35 |
| | | D-3 | 0.40 |
| V-1 | H-1 | D-1 | 0.02 |
| | | D-2 | 0.04 |
| | | D-3 | 0.04 |
| V-2 | H-1 | D-1 | 0.03 |
| | | D-2 | 0.05 |
| | | D-3 | 0.06 |
| V-3 | H-1 | D-1 | 0.35 |
| | | D-2 | 0.74 |
| | | D-3 | 0.84 |
| V-4 | H-1 | D-1 | 0.46 |
| | | D-2 | 0.95 |
| | | D-3 | 1.09 |
| V-5 | H-1 | D-1 | 0.62 |
| | | D-2 | 1.29 |
| | | D-3 | 1.47 |
| V-6 | H-1 | D-4 | 0.10 |
| | | Lumogen 305 | 0.075 |
| | | D-3 | 0.125 |
| V-7 | H-1 | D-4 | 0.20 |
| | | Lumogen 305 | 0.15 |
| | | D-3 | 0.25 |
| V-8 | H-1 | D-4 | 0.40 |
| | | Lumogen 305 | 0.30 |
| | | D-3 | 0.50 |
| V-9 | H-2 | D-1 | 0.03 |
| | | D-2 | 0.05 |
| | | D-3 | 0.06 |

3) Composition of the Host Mixtures:

| | H-1 | H-2 |
|---|---|---|
| Clearing point | 77.5° C. | 114.5° C. |
| Dielectric anisotropy $\Delta\varepsilon$ | 11.3 | 10.5 |
| Optical anisotropy $\Delta n$ | 0.1255 | 0.1342 |

| Composition | Compound | % | Compound | % |
|---|---|---|---|---|
| | PZG-2-N | 0.936 | CPG-3-F | 5 |
| | PZG-3-N | 0.936 | CPG-5-F | 5 |
| | PZG-4-N | 2.184 | CPU-3-F | 15 |
| | PZG-5-N | 2.184 | CPU-5-F | 15 |
| | CP-3-O1 | 7.488 | CP-3-N | 16 |
| | CC-3-4 | 3.12 | CP-5-N | 16 |
| | CPP-3-2 | 2.496 | CCGU-3-F | 7 |
| | CCZGI-3-3 | 2.496 | CGPC-3-3 | 4 |
| | CCZGI-3-5 | 2.496 | CGPC-5-3 | 4 |
| | CCZPC-3-3 | 1.248 | CGPC-5-5 | 4 |
| | CCZPC-3-4 | 1.248 | CCZPC-3-3 | 3 |
| | CCZPC-3-5 | 0.936 | CCZPC-3-4 | 3 |
| | CPZG-3-N | 1.248 | CCZPC-3-5 | 3 |
| | CGPC-5-3 | 1.248 | | |
| | CPPC-5-3 | 0.936 | | |
| | CPU-3-F | 34.4 | | |
| | CPU-5-F | 34.4 | | |

4) Structures of the Dyes:

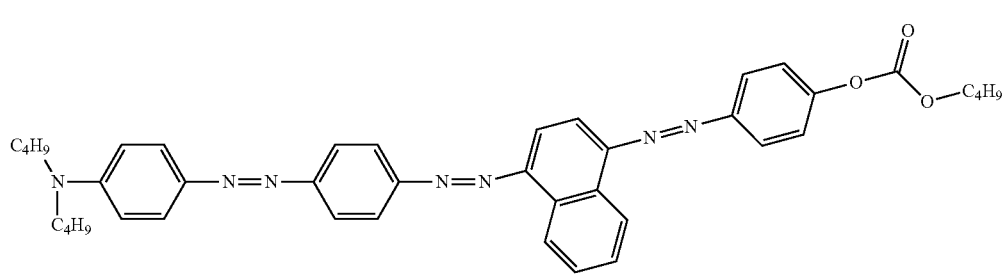

D-1

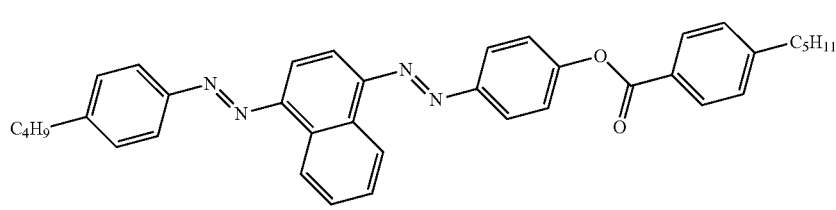

D-2

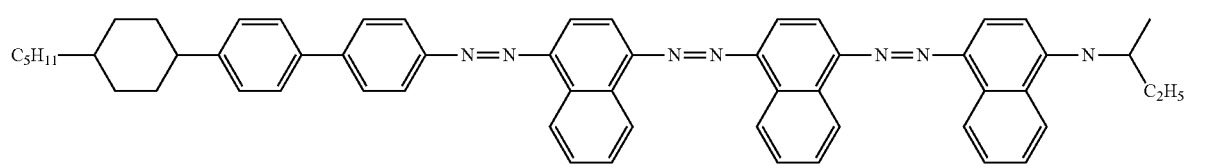

D-3

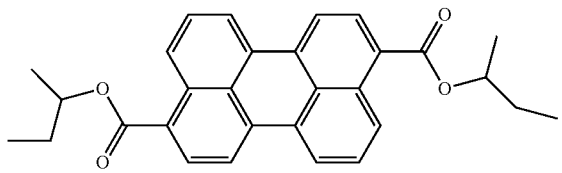

D-4

The dye Lumogen 305 is commercially available from BASF SE.

B) Determination of the Parameters $\tau_{v\ bright}$ (degree of Light Transmission in the Bright State) and R (Degree of Anisotropy) and H (Range)

1) The degree of anisotropy R is determined at 550 nm from the value for the absorbance E(p) of a device comprising two glass sheets with alignment layers and liquid-crystalline medium comprising dichroic dyes arranged in between, with parallel alignment of the dye molecules, and the value for the absorbance E(s) of the same device with perpendicular alignment of the dye molecules. Parallel alignment of the dye molecules is achieved by an alignment layer. The absorbance of the device is measured against a device which comprises no dye, but has an otherwise identical construction. The measurement is carried out using polarised light whose plane of vibration in one case vibrates parallel to the alignment direction (E(p)) and in a subsequent measurement vibrates perpendicular to the alignment direction (E(s)). The sample is not switched or rotated during the measurement. The measurement of E(p) and E(s) is thus carried out via the rotation of the plane of vibration of the incident polarised light.

In detail, the procedure is as described below: the spectra for measurement of E(s) and E(p) are recorded using a Perkin Elmer Lambda 1050 UV spectrometer. The spectrometer is fitted with a Glan-Thompson polariser for the wavelength range 250 nm-2500 nm in both the measurement and reference beams. The two polarisers are controlled by a stepping motor and are aligned in the same direction. A change in the polariser direction of the polariser, for example changeover from 0° to 90°, is always carried out synchronously and in the same direction for the measurement and reference beams. The alignment of an individual polariser can be determined using a method which is described in the dissertation by T. Karstens, University of Würzburg, 1973. In this method, the polariser is rotated in 5° steps against an aligned dichroic sample, and the absorbance is recorded at a fixed wavelength, preferably in the region of maximum absorption. A new zero line is run for each polariser position. For measurement of the two dichroic spectra E(p) and E(s), an antiparallel-rubbed test cell, coated with polyimide AL-1054 from JSR, is located in both the measurement and reference beams. The two test cells should be selected of the same layer thickness, typically 15-25 µm. The test cell containing pure host (liquid crystal) is located in the reference beam. The test cell containing the solution of dye in liquid crystal is located in the measurement beam. The two test cells for measurement and reference beams are installed in the ray path in the same alignment direction. In order to guarantee the greatest possible accuracy of the spectrometer, it is ensured that E(p) is in the wavelength range of its greatest absorption, preferably between 0.5 and 1.5. This corresponds to transmissions of 30%-5%. This is set by corresponding adjustment of the layer thickness and/or dye concentration.

The degree of anisotropy R is calculated from the measured values for E(p) and E(s) in accordance with the formula $$R=[E(p)-E(s)]/[E(p)+2*E(s)],$$

as indicated in "Polarized Light in Optics and Spectroscopy", D. S. Kliger et al., Academic Press, 1990.

2) The degree of light transmission in the bright state $\tau_{v\ bright}$ is indicated in percent. It is calculated from the spectral degrees of transmission in the bright state of a device comprising two glass sheets with alignment layers and liquid-crystalline medium comprising dichroic dyes arranged in between, relative to an otherwise identical device without dye in the liquid-crystalline medium as reference. The measurement set-up is the same as in the case of the measurements of the absorbances for the degree of anisotropy.

The degree of light transmission $\tau_{v\ bright}$ is determined in accordance with European Standard EN410, equation (1) (Determination of luminous and solar characteristics of glazing) from the measured spectral degrees of transmission taking into account the relative spectral distribution of the standard illuminant and the spectral degree of brightness sensitivity of the standard observer.

3) The range H is indicated in percent. It represents the difference between the degree of light transmission of the switching layer in the bright state of the device ($\tau_{v\ bright}$) and the degree of light transmission of the switching layer in the dark state of the device ($\tau_{v\ dark}$). The value $\tau_{v\ dark}$ here is determined in accordance with the above-mentioned method for the measurement of $\tau_{v\ bright}$, while the device is switched into the dark state.

4) Values Obtained for Devices E-1 to E-6 and V-1 to V-9

| | $\tau_{v\ bright}$/% (in acc. with EN410) | R (550 nm) | H/% ($\tau_{v\ bright} - \tau_{v\ dark}$ in each case in acc. with EN410) |
|---|---|---|---|
| E-1 | 87.5 | 0.68 | 29.7 |
| E-2 | 74.6 | 0.74 | 33.3 |
| E-3 | 62.0 | 0.73 | 29.9 |
| E-4 | 89.3 | 0.77 | 30.2 |
| E-5 | 79.2 | 0.75 | 35.2 |
| E-6 | 68.0 | 0.77 | 32.5 |
| V-1 | 94.3 | 0.73 | 15.6 |
| V-2 | 92.9 | 0.75 | 20.1 |
| V-3 | 36.9 | ~0.73 | 17.5 |
| V-4 | 29.4 | ~0.73 | 13.5 |
| V-5 | 17.9 | ~0.73 | 7.9 |
| V-6 | 82.3 | 0.50 | 20.2 |
| V-7 | 67.1 | 0.49 | 24.6 |
| V-8 | 44.3 | 0.49 | 20.1 |
| V-9 | 93.8 | 0.79 | 20.7 |

The examples show that devices having very different ranges H—between 7.9% and 35.2%—are obtained depending on the choice of the parameters $\tau_{v\ bright}$ and R.

Desired ranges H in the region of 25% and higher (devices E-1 to E-6) are only achieved if the parameters $\tau_{v\ bright}$ and R are selected suitably: R must have a value of at least 0.65, and $\tau_{v\ bright}$ must be between 40 and 90%.

If one or both of the parameters are selected outside this range, inadequate ranges H are achieved which are significantly less than 20%, in some cases less than 10% (comparative devices V-1 to V-9).

The measurements show that basically low ranges are achieved in the case of a degree of anisotropy R selected too low (V-6 to V-8). It is irrelevant whether the value for $\tau_{v\ bright}$ is selected high, as in Example V-6, or low, as in Example V-8.

However, if the degree of anisotropy is sufficiently high (E-1 to E-6 and V-9), suitable ranges H can be achieved, but only in combination with suitable values for $\tau_{v\ bright}$, as shown by the example of V-9, in which, in spite of a suitable value for R, a satisfactory value for the range H is not obtained owing to the excessively high $\tau_{v\ bright}$.

The measurements furthermore show that basically only low ranges are achieved in the case of inadequate bright transmission $\tau_{v\ bright}$, irrespective of whether a suitable value for R is present (V-5).

The measurements furthermore show that satisfactory values for the range H cannot be achieved in the case of excessively high values for $\tau_{v\ bright}$ (V-1, V-2 and V-9), irrespective of whether the value for the anisotropy R is high or low.

The experiments therefore show in summary the surprising result that high ranges of the light transmission can only be achieved on combination of suitable values for the anisotropy with suitable values for the bright transmission $\tau_{v\ bright}$.

The examples shown specifically serve for explanation and illustration of the invention. The person skilled in the art will be able to produce further devices within the scope of the claims by preparing liquid-crystalline media having a suitable degree of anisotropy. This succeeds with utilisation of his general expert knowledge and general basic correlations, such as, for example, the correlation between molecular structure and degree of anisotropy of a dye and the influence of the other compounds of the liquid-crystalline medium on these parameters. Devices having suitable bright transmission can be produced by a suitable choice of the absorbance of the dyes and concentration thereof in the switching layer.

The invention claimed is:

1. A device for regulating the passage of light through a light-transmitting area, said device comprising:
    one or more glass layers and at least one switching layer which comprises a liquid-crystalline medium comprising at least one dichroic dye,
    wherein said switching layer has a bright state $\tau_{v\ bright}$ and a dark state $\tau_{v\ dark}$, and
    wherein said switching layer has a degree of anisotropy R of at least 0.65 and a degree of light transmission in the bright state $\tau_{v\ bright}$ in accordance with Standard EN410 of 40% to 90%,
    wherein said device is a component of a window,
    wherein said switching layer comprises three or more different dichroic dyes, and
    wherein the liquid-crystalline medium has a clearing point in the temperature range from 70° C. to 170° C.

2. The device according to claim 1, further comprising one or more alignment layers which are arranged directly adjacent to the switching layer.

3. The device according to claim 1, further comprising precisely two alignment layers, one of said alignment layers which is adjacent to one side of the switching layer and the other of said alignment layers is adjacent to the opposite side of the switching layer, and where the two alignment layers cause a parallel or 90°-rotated preferential direction of the molecules of the liquid-crystalline medium on both sides of the switching layer.

4. The device according to claim 1, wherein homogeneous alignment of the molecules of the liquid-crystalline medium is present in the voltage-free state, where the molecules are aligned parallel to one another on both sides of the switching layer.

5. The device according to claim 1, further comprising means for the alignment of the molecules of the liquid-crystalline medium of the switching layer by electrical voltage.

6. The device according to claim 1, further comprising a light-guide system which conducts light from the switching layer to a unit which converts light energy into electrical energy or heat energy.

7. The device according to claim 1, further comprising an element for the conversion of light energy into electrical energy which is electrically connected to said device.

8. The device according to claim 1, wherein said one or more glass layers have an antireflection design.

9. The device according to claim 1, wherein said device comprises precisely one switching layer.

10. The device according to claim 1, wherein at least one of said dichroic dyes is luminescent.

11. The device according to claim 1, wherein at least one of the dichroic dyes is an azo compound, an anthraquinone, a methine compound, an azomethine compound, a merocyanine compound, an naphthoquinone, a tetrazine, a perylene, a terrylene, a quaterrylenes, a higher rylene or a pyrromethene.

12. The device according to claim 1, wherein said device has an area of at least 0.05 m².

13. The device according to claim 1, wherein said switching layer has a degree of anisotropy R of 0.7 to 0.9.

14. The device according to claim 1, wherein said switching layer has a degree of light transmission in the bright state $\tau_{v\ bright}$ of 60% to 85%.

15. The device according to claim 1, wherein the following applies to the parameter $T_{v\ bright}$ of the switching layer for a given parameter R of the switching layer:

$\tau_{v\ bright\ min} < \tau_{v\ bright} < \tau_{v\ bright\ max}$ and $\tau_{v\ bright\ min} = 0.8*(67*R+30)$ and $\tau_{v\ bright\ max} = 1.2*(67*R+30)$.

16. The device according to claim 1, wherein the following applies to the parameter R of the switching layer for a given parameter $T_{v\ bright}$:

$R_{min} < R < R_{max}$ and $R_{min} = 0.8*(0.015*\tau_{v\ bright} - 0.45)$ and $R_{max} = 1.2*(0.015*\tau_{v\ bright} - 0.45)$.

17. The device according to claim 1, wherein said device comprises two or more glass layers, and in that the degree of light reflection $\rho_v$ in accordance with Standard EN410 of the totality of the layers of the device with the exception of the switching layer is less than 35%.

18. A window comprising multipane insulating glass and at least one device according to claim 1.

19. A method for regulating the passage of light through a light-transmitting area into an interior space, said method comprising regulating said passage of light via passage through a device according to claim 1.

20. The device according to claim 1, wherein said device comprises two or more glass layers, and in that the degree of light reflection $\rho_v$ in accordance with Standard EN410 of the totality of the layers of the device with the exception of the switching layer is less than 30%.

21. The device according to claim 1, further comprising a first electrode installed on one side of the switching layer and a second electrode installed on the other side of the switching layer, and wherein application of a voltage across the electrodes cause a change in the alignment of the molecules of the liquid-crystalline medium including the molecules of the at least one dichroic dye and a resultant change in the light transmission of the device.

22. The window according to claim 18, wherein said device is applied to the outside of a pane of the multipane insulating glass.

23. The window according to claim 18, wherein said device is positioned between two panes of the multipane insulating glass.

24. The device according to claim 1, wherein said device comprises the following arrangement of layers:
1) a first glass layer,
2) a first electrically conductive layer,
3) a first alignment layer,
4) said switching layer,
5) a second alignment layer,
6) a second electrically conductive layer,
7) a second glass layer, and
8) a third glass layer,
wherein a free space is present between the second and third glass layers and where said free space is optionally filled with an insulating gas.

25. The device according to claim 1, wherein said device is a switchable device that provides for a change in the light transmission of the device, wherein the switching occurs by transition of the liquid-crystalline medium from a nematic state to an isotropic state due to a change in the temperature of the switching layer.

26. The device according to claim 1, wherein the proportion of all dichroic dyes together in the liquid-crystalline medium is in total 0.01 to 10% by weight.

27. The device according to claim 1, wherein the liquid-crystalline medium has a dielectric anisotropy greater than 3, an optical anisotropy (An) of 0.01 to 0.3, and a specific electrical resistance of greater than $10^{10}$ ohm*cm.

28. The device according to claim 1, wherein said liquid-crystalline medium comprises at least one of the following dichroic dyes:

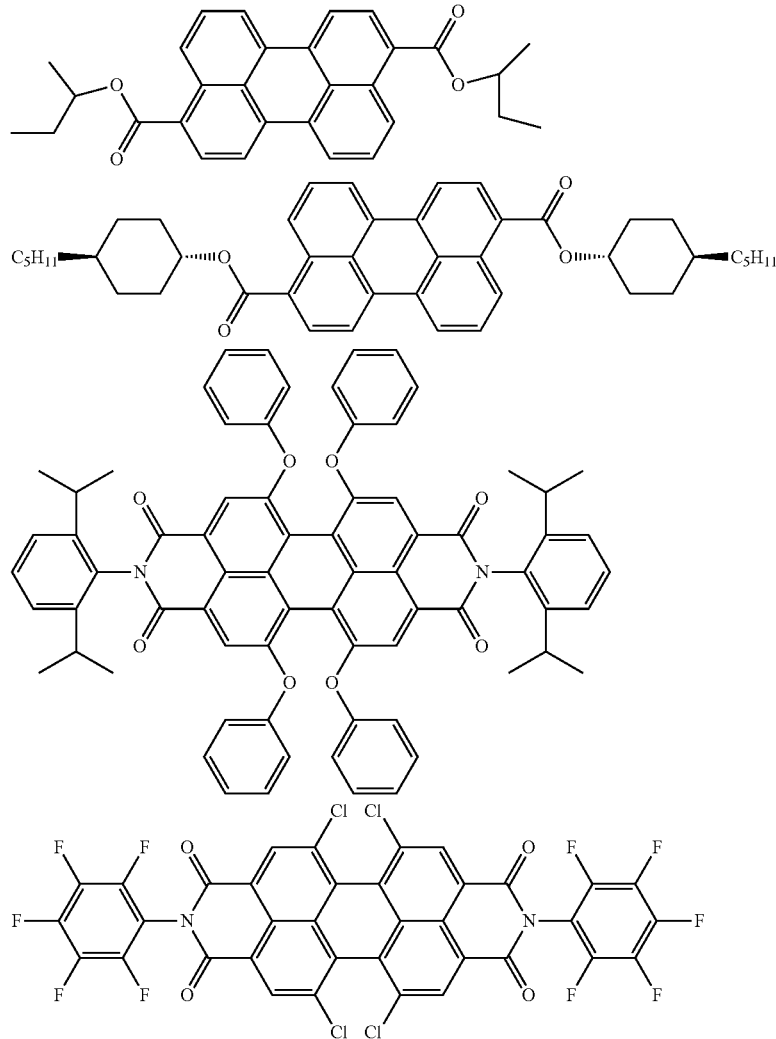

| 29 | 30 |
|---|---|
| 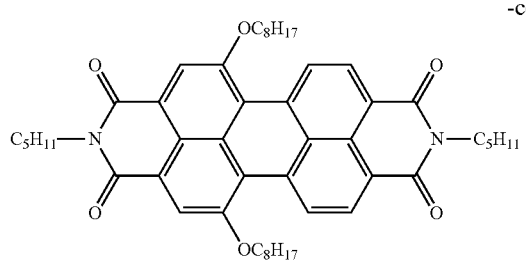 | 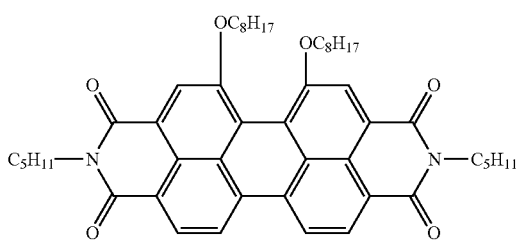 |
| 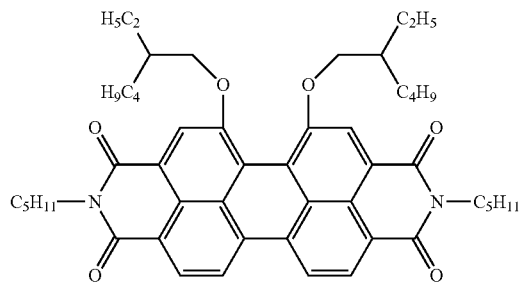 | 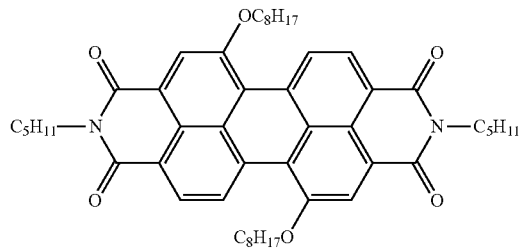 |
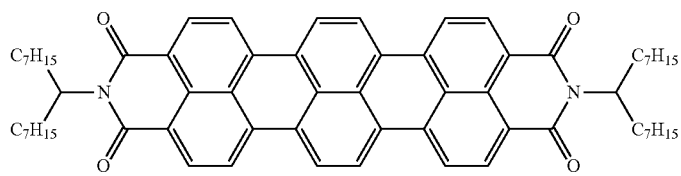
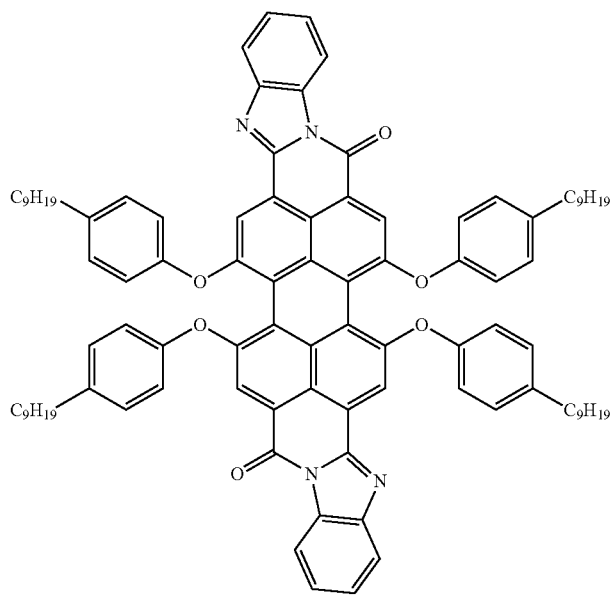
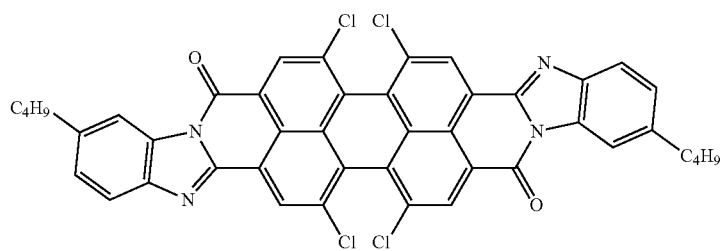

-continued
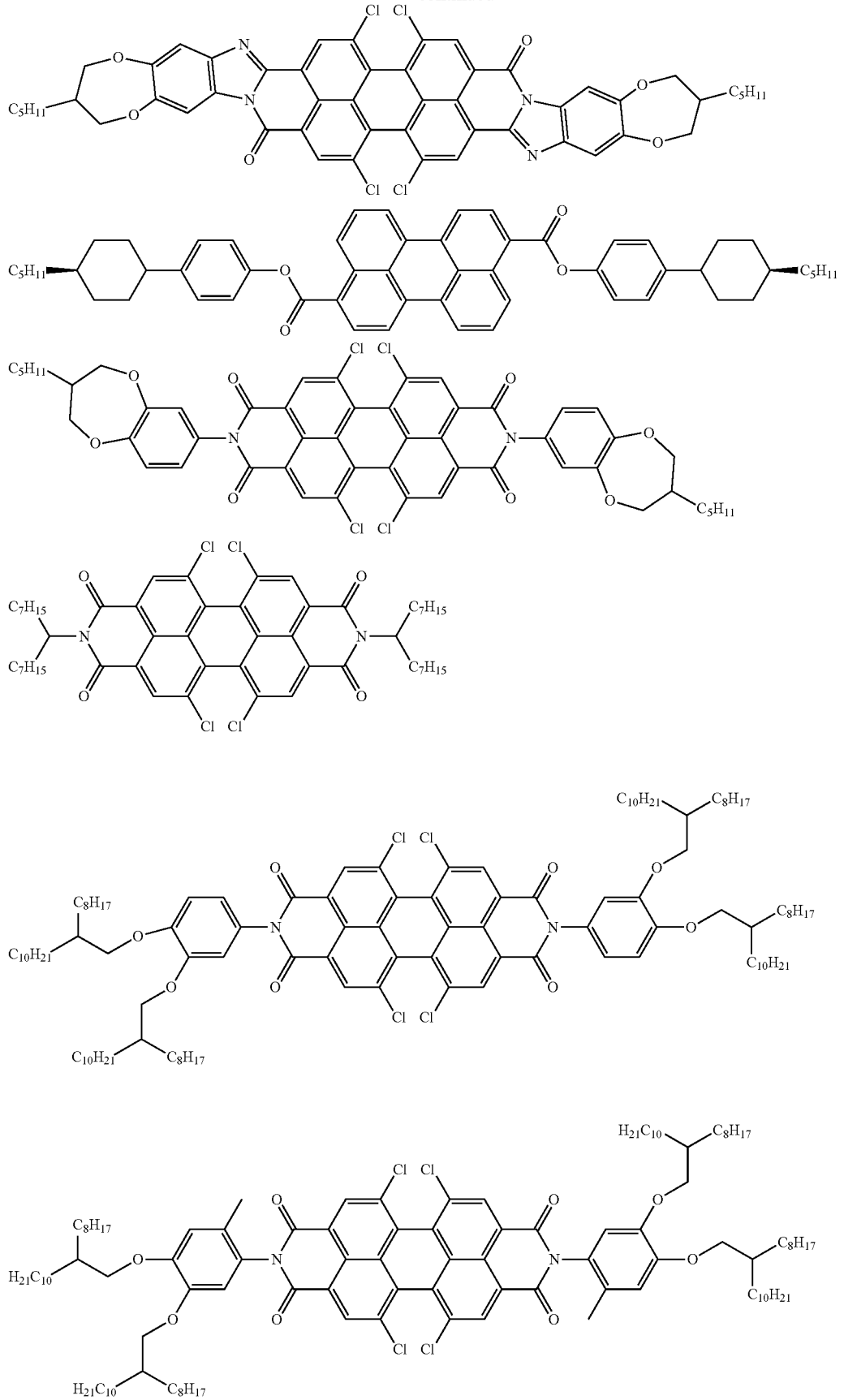

-continued
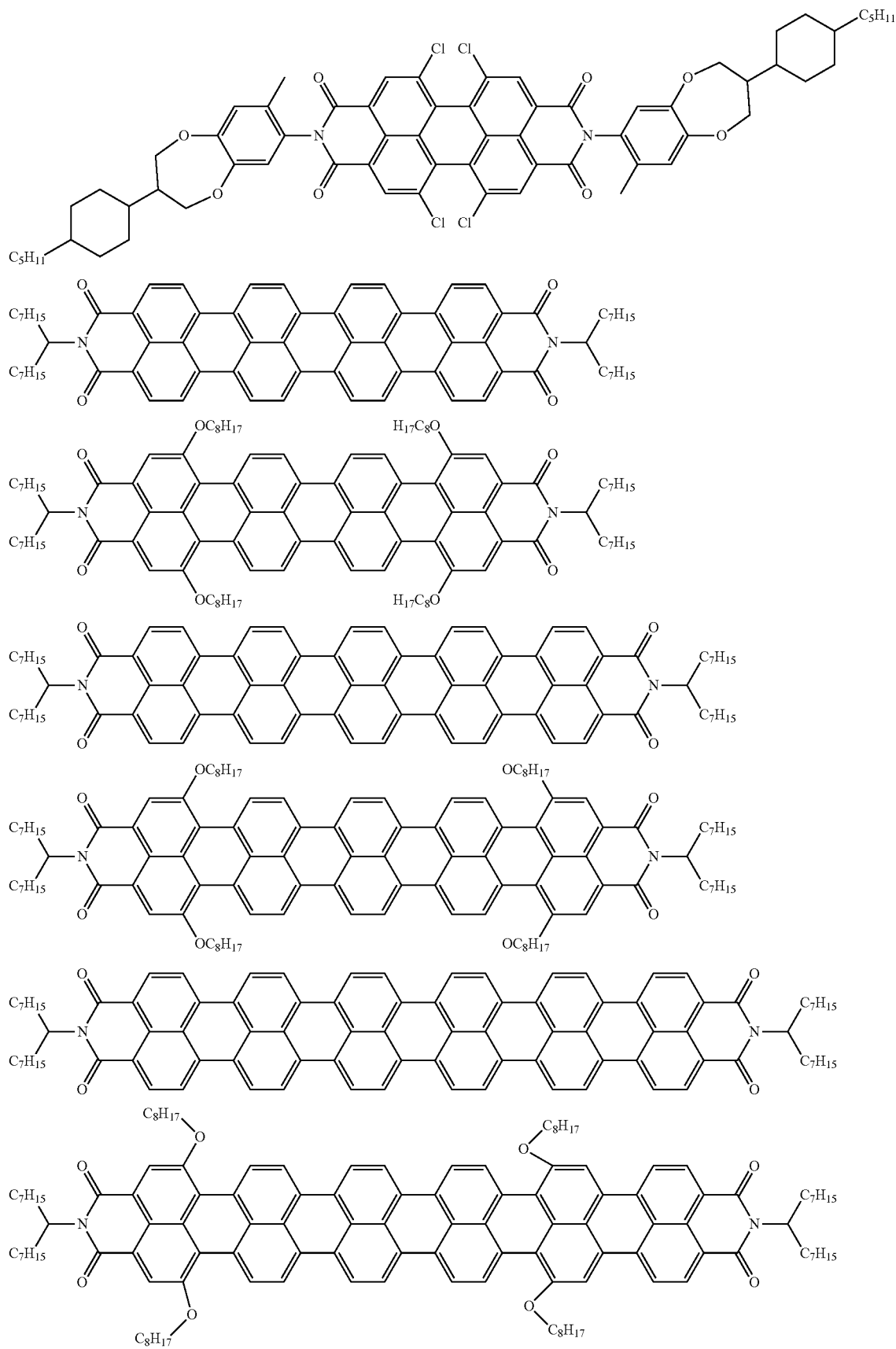

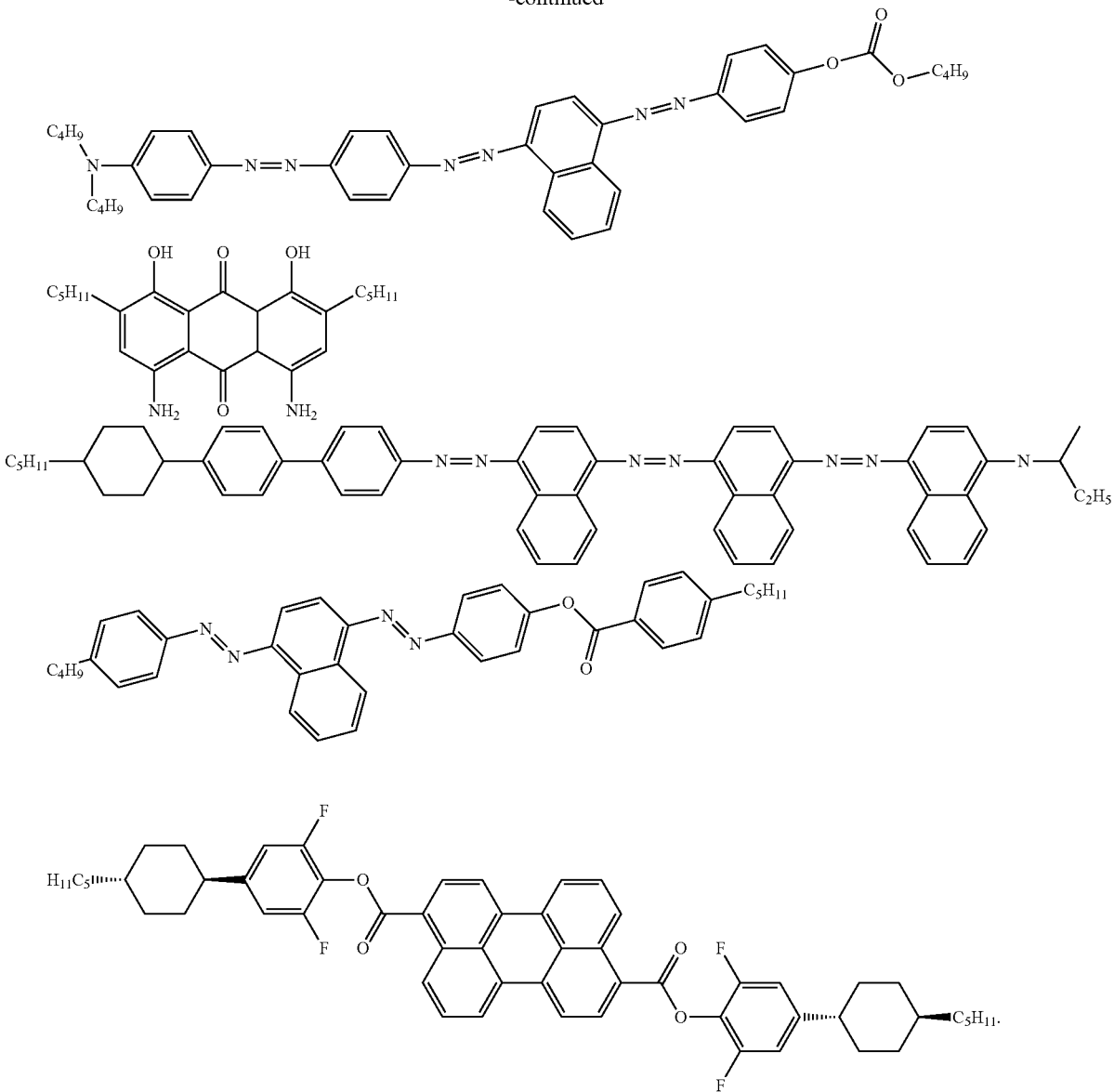
29. A window comprising multipane insulating glass and at least one device according claim 24 wherein which a first glass pane of the window is formed by a glass pane of said at least one device.
30. The device according to claim 1, wherein said liquid-crystalline medium comprises the following dichroic dyes:
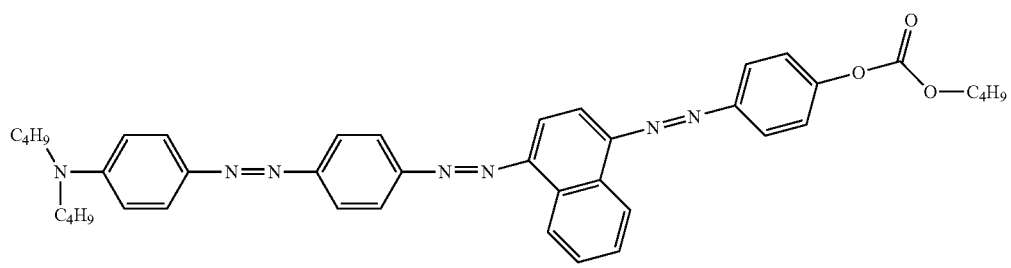

-continued
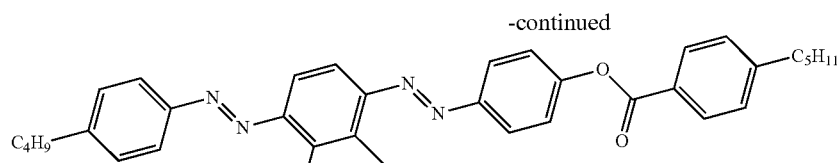
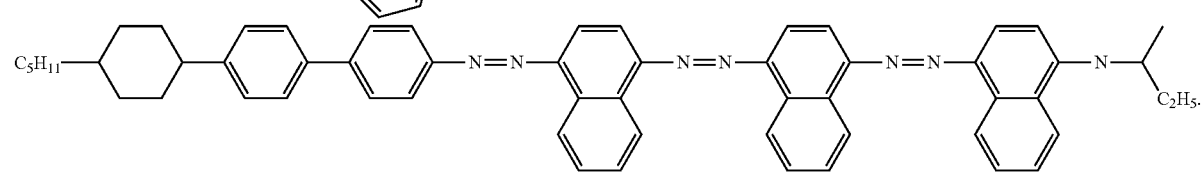
31. The device according to claim 1, wherein the difference between the degree of light transmission of the switching layer in the bright state $\tau_{v\,bright}$ and the degree of light transmission of the switching layer in the dark state $\tau_{v\,dark}$ is at least 25%.
* * * * *